United States Patent [19]
Bayersten

[11] Patent Number: 5,309,490
[45] Date of Patent: May 3, 1994

[54] REMOTE STUD CLEANER
[75] Inventor: Bengt I. Bayersten, Simsbury, Conn.
[73] Assignee: Combustion Engineerign, Inc., Windsor, Conn.
[21] Appl. No.: 790,843
[22] Filed: Nov. 12, 1991
[51] Int. Cl.[5] .............................. G21C 19/42
[52] U.S. Cl. ..................... 376/310; 376/205
[58] Field of Search ............ 376/310, 316, 205, 206, 376/249; 51/401; 976/DIG. 207; 15/88, 21.1, 33

[56] References Cited
U.S. PATENT DOCUMENTS 4,165,549  8/1979  Wennerstrom et al. ............... 15/88
4,452,753  6/1984  Wentzell et al. ..................... 376/249
4,630,410  12/1986  Cavada et al. ........................ 51/410
4,675,967  6/1987  Okada ................................. 29/240

Primary Examiner—Donald P. Walsh
Assistant Examiner—Meena Chelliah
Attorney, Agent, or Firm—John H. Mulholland

[57] ABSTRACT

A device 20 for cleaning threaded studs 14 securing the dome-shaped head of a nuclear reactor pressure vessel to the vessel body 10 comprises a cylindrical brush holder 24 rotatably carried in a housing 22. An annular steel wire brush 28, disposed on the inner surface of the brush holder 24, is adapted to fit over and engage the threaded portion 14a of a stud 14. An electric motor 26 mounted on the housing 22 rotates the brush holder 24 as it is lowered onto an upstanding stud 14. A vacuum source connected to the housing 22 captures any particulate matter removed from the stud 14.

6 Claims, 2 Drawing Sheets

REMOTE STUD CLEANER

BACKGROUND AND SUMMARY OF THE INVENTION

The present invention relates to a device for cleaning threaded studs and, more particularly, to a device for cleaning such studs in a radioactive or otherwise hazardous environment.

The domed head of a nuclear reactor pressure vessel is normally secured to the vessel body by means of a plurality of very large threaded bolts or studs. These studs can be several feet long and more than six inches in diameter. At scheduled intervals called "outages", the reactor is shut down, so that, a refueling and fuel shuffling operative can be performed and various pieces of equipment, including the studs, can be cleaned and inspected. Due to their size, manual cleaning of the studs is quite cumbersome. More importantly, the studs, and other pressure vessel components, are radioactive and, thus, personnel can only be exposed thereto for short periods of time.

It is, therefore, a primary object of the present invention to provide a device for cleaning threaded studs on a nuclear reactor pressure vessel and, further, to provide such a device by which cleaning of the studs may be effected while minimizing the exposure of personnel to radiation.

The foregoing and other objects and advantages as may hereinafter appear, are accomplished by a device comprising a cylindrical brush holder rotatably carried in a housing. An annular brush, disposed on the inner surface of the brush holder, is adapted to telescopingly engage the threaded portion of a stud. Motor means, preferably an electric motor mounted on the housing, rotates the brush to clean the stud threads. Advantageously, guide means, preferably a frusto-conical member disposed on the lower end of the housing, facilitates lowering the device onto an upstanding stud. Vacuum means may be provided, preferably comprising a vacuum source connected to the housing, to capture particulate matter, much of which is radioactive, dislodged from a stud during cleaning.

BRIEF DESCRIPTION OF THE WINGS

FIG. 1 a fragmentary perspective view of a reactor pressure vessel with the domed top removed and the studs exposed; and FIG. 2 is a simplified cross-sectional view of a cleaning device in accord with the present invention, shown in association with a stud.

DESCRIPTION OF THE PREFERRED EMBODIMENT

Figure 1:
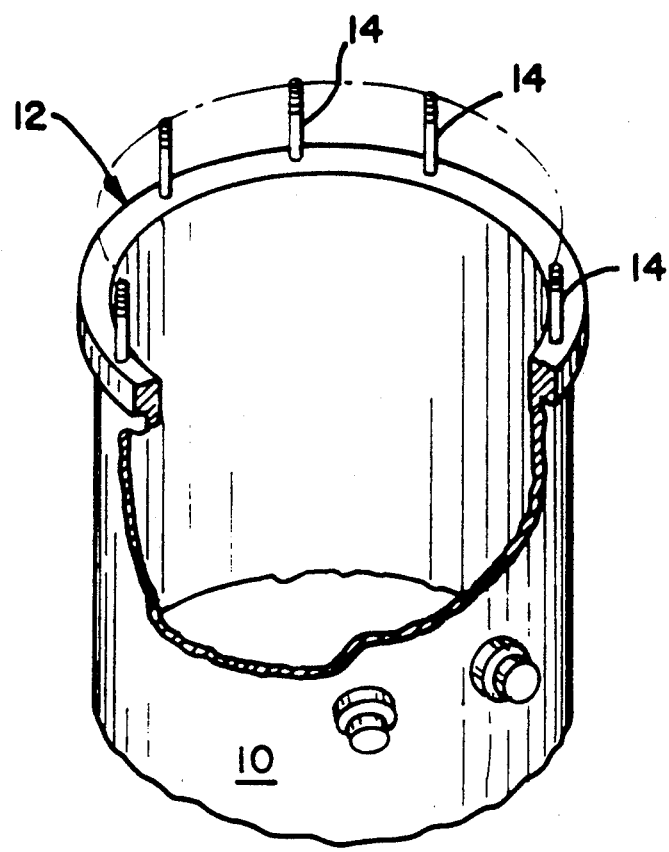

Turning now to the drawings, there is illustrated, in FIG. 1, a nuclear reactor pressure vessel body 10 having, at its upper edge, an annular flange 12 provided with a plurality of upstanding threaded studs 14. A domed pressure vessel head (not shown) normally rests on flange 12 and is secured thereto by studs 14.

Figure 2:
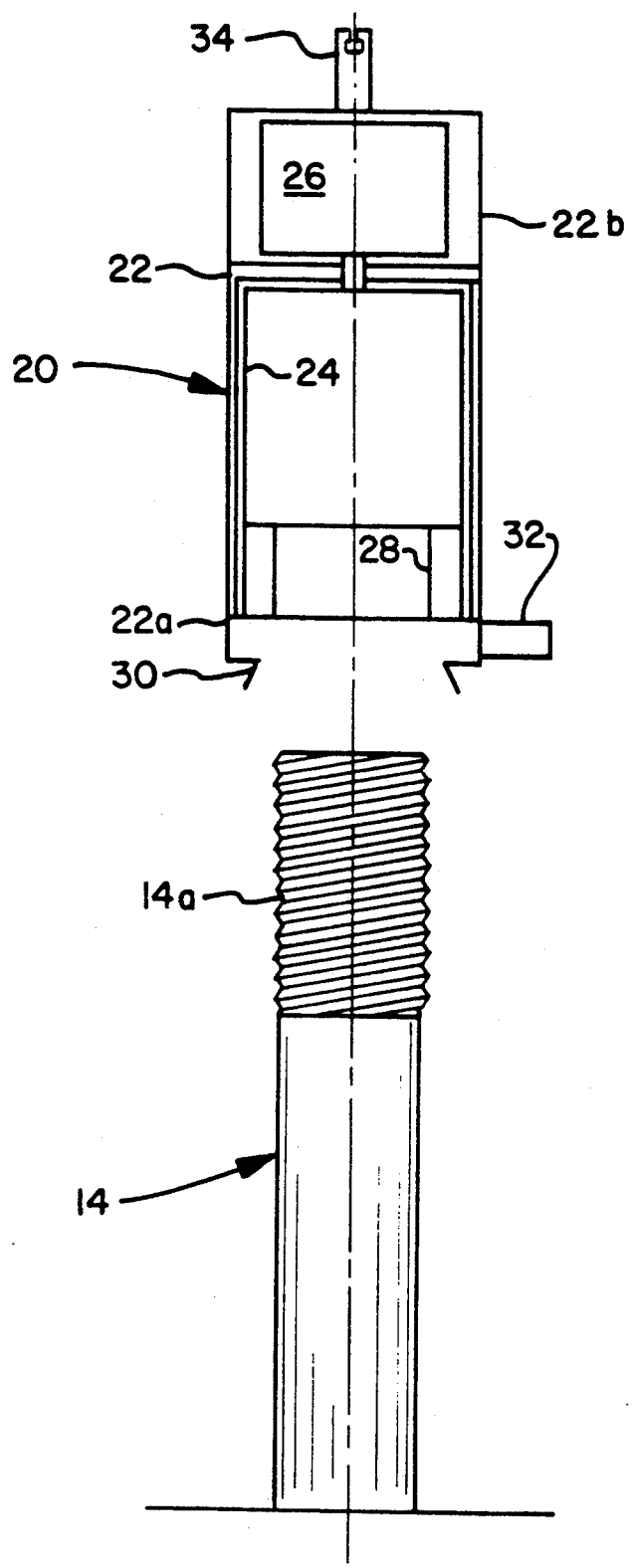

In FIG. 2, there is shown an enlarged view of one of studs 14 and, in association therewith, a cleaning device 20 comprising a housing 22, in the form of a right circular cylinder, and a brush holder 24, also in the form of a right circular cylinder. Brush holder 24 is telescopically and rotatably carried in housing 22 and driven by connection to the output shaft of an electric motor 26 fixed therein.

An annular steel wire brush 28, adapted for telescoping engagement with the threaded portion 14a of stud 14, is removably disposed on the inner surface of brush holder 24 at the distal end thereof.

A frusto-conical guide member 30 is fixed to the lower end 22a of housing 22, and serves to guide the device 20 over an upright stud 14 as the device is being lowered thereonto.

A vacuum connection 32 is provided in lower end 22a of housing 22, proximate brush 28. By means of a vacuum (not shown) connected to vacuum connection 32, particulate matter dislodged from a stud during cleaning may be captured.

In use, cleaning device 20 is lowered onto a stud 14 by an overhead crane or hoist (not shown) which engages a lifting ring 34 on upper end 22b of housing 22. As brush 28 rotates about threaded portion 14a of stud 14, device 20 may be repetitively raised and lowered so as to also impart a vertical motion to insure the entire length is cleaned.

I claim:

1. A device for cleaning threaded studs on a nuclear reactor pressure vessel comprising:
   a right cylindrical housing;
   a right cylindrical brush holder telescopically and rotatably carried within said housing;
   an annular brush disposed on the inner surface of said brush holder, proximate an end thereof, said brush being adapted for telescopic engagement with the threaded portion of a stud;
   motor means for rotating said brush holder relative to said housing; and
   lifting means for attaching said housing to a crane or hoist.

2. The stud cleaning device of claim 1, wherein said motor means comprises an electric motor fixed to said housing.

3. The stud cleaning device of claim 2, further comprising vacuum means for capturing particulate matter dislodged from a stud during cleaning.

4. The stud cleaning device of claim 2, further comprising guide means for guiding said device over an upright stud as said device is being lowered thereonto.

5. The stud cleaning device of claim 4, wherein said guide means comprises a frusto-conical member fixed to an end of said housing.

6. The stud cleaning device of claim 3, wherein said vacuum means comprises a vacuum connection on said housing, proximate said brush.

* * * * *